(12) United States Patent
Cole et al.

(10) Patent No.: US 8,700,030 B1
(45) Date of Patent: *Apr. 15, 2014

(54) HANDSET DIAGNOSTIC TOOL

(75) Inventors: Joshua R. Cole, Overland Park, KS (US); Peter K. Mwangi, Overland Park, KS (US); Bindu A. Sundar, Overland Park, KS (US); Charles T. Vanderwist, Montrose, CO (US)

(73) Assignee: Sprint Communications Company L.P., Overland Park, KS (US)

( * ) Notice: Subject to any disclaimer, the term of this patent is extended or adjusted under 35 U.S.C. 154(b) by 611 days.

This patent is subject to a terminal disclaimer.

(21) Appl. No.: 13/041,195

(22) Filed: Mar. 4, 2011

(51) Int. Cl.
*H04W 24/00* (2009.01)

(52) U.S. Cl.
USPC .......................................... 455/425

(58) Field of Classification Search
USPC ........ 455/509, 67.11, 456.1, 226.1, 425, 423; 706/12; 726/24; 704/245
See application file for complete search history.

(56) References Cited

U.S. PATENT DOCUMENTS

| 7,751,813 | B2 | 7/2010 | Varanda |
| 8,315,655 | B1 | 11/2012 | Cole |
| 2007/0124583 | A1 | 5/2007 | Andersson et al. |
| 2011/0263243 | A1 | 10/2011 | Topaltzas et al. |

OTHER PUBLICATIONS

Cole, Joshua R., et al., Patent Application entitled "System and Method Using Mobile Phone as Test System Component," filed Jul. 12, 2011, U.S. Appl. No. 13/181,455.

Notice of Allowance dated Jul. 12, 2012, U.S. Appl. No. 13/181,455, filed Jul. 12, 2011.

*Primary Examiner* — Kiet Doan

(57) ABSTRACT

A system for electronic device diagnostics is provided. The system comprises a computer, a memory coupled to the computer, and an application stored in the memory. The application establishes a communication link with a first electronic device, where the first electronic device has previously been sold. The application then determines a first model identity of the first electronic device via the first communication link, and based on the first model identity, selects a first plurality of diagnostic tests from a library. Additionally, the application performs the diagnostic tests, at least some of which comprise invoking commands on the first electronic device via the first communication link. Based on a result of the diagnostic tests, either a command is invoked via the first communication link to perform a corrective procedure on the first electronic device, or a description of a corrective procedure to perform is presented on the first electronic device.

4 Claims, 6 Drawing Sheets

HANDSET DIAGNOSTIC TOOL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices used for mobile voice or data communication based on network connectivity provided by base stations known as cell towers or sites. In addition to the standard voice function of a mobile telephone, current mobile phones and other similar portable electronic devices may support additional services including short message service (SMS) for text messaging, electronic mail, and packet switching for access to the Internet. When a problem occurs with a mobile telephone, the user may drive to a local retail location to receive service on the device. Alternatively, the user may work with a customer care organization of the communication service provider. The user may provide information and manually troubleshoot the problem themselves based on directions given by the customer care agent.

SUMMARY

In an embodiment, a system for post-sale electronic device diagnostics is disclosed. The diagnostic system is comprised of a computer system, a memory coupled to the computer system, and an application stored in the memory. When executed by the processor, the application establishes a first communication link with a first electronic device, where the first electronic device has previously been sold. The application then determines a first model identity of the first electronic device via the first communication link, and based on the first model identity, selects a first plurality of diagnostic tests from a library of diagnostic tests. Additionally, the application performs the first plurality of diagnostic tests, at least some of which comprise invoking commands on the first electronic device via the first communication link. Based on a result of the first plurality of diagnostic tests, either a command is invoked via the first communication link to perform a corrective procedure on the first electronic device, or a description of a corrective procedure to perform is presented on the first electronic device.

In an embodiment, a method of repairing a mobile phone is disclosed. The method comprises establishing a first communication link with a first mobile phone and automatically determining a first model identity of the first mobile phone. The method further comprises automatically selecting a first plurality of diagnostic tests based on the first model identity and automatically performing the first plurality of diagnostic tests on the first mobile phone. Based at least in part on a result of performing the first plurality of diagnostic tests, determining a first corrective action and either presenting instructions for performing the first corrective action or performing the first corrective action via the first communication link of the first mobile phone.

In an embodiment, a method of managing vendor specifications is disclosed. The method comprises automatically testing a first mobile phone via a communication link established in a commercial retail location. A result of the testing is automatically stored in a data store, and the results are automatically analyzed. Based on the analysis, an additional procedure is added to a vendor mobile phone certification specification, and the vendor mobile phone certification specification containing the additional procedure is electronically transmitted to the first vendor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
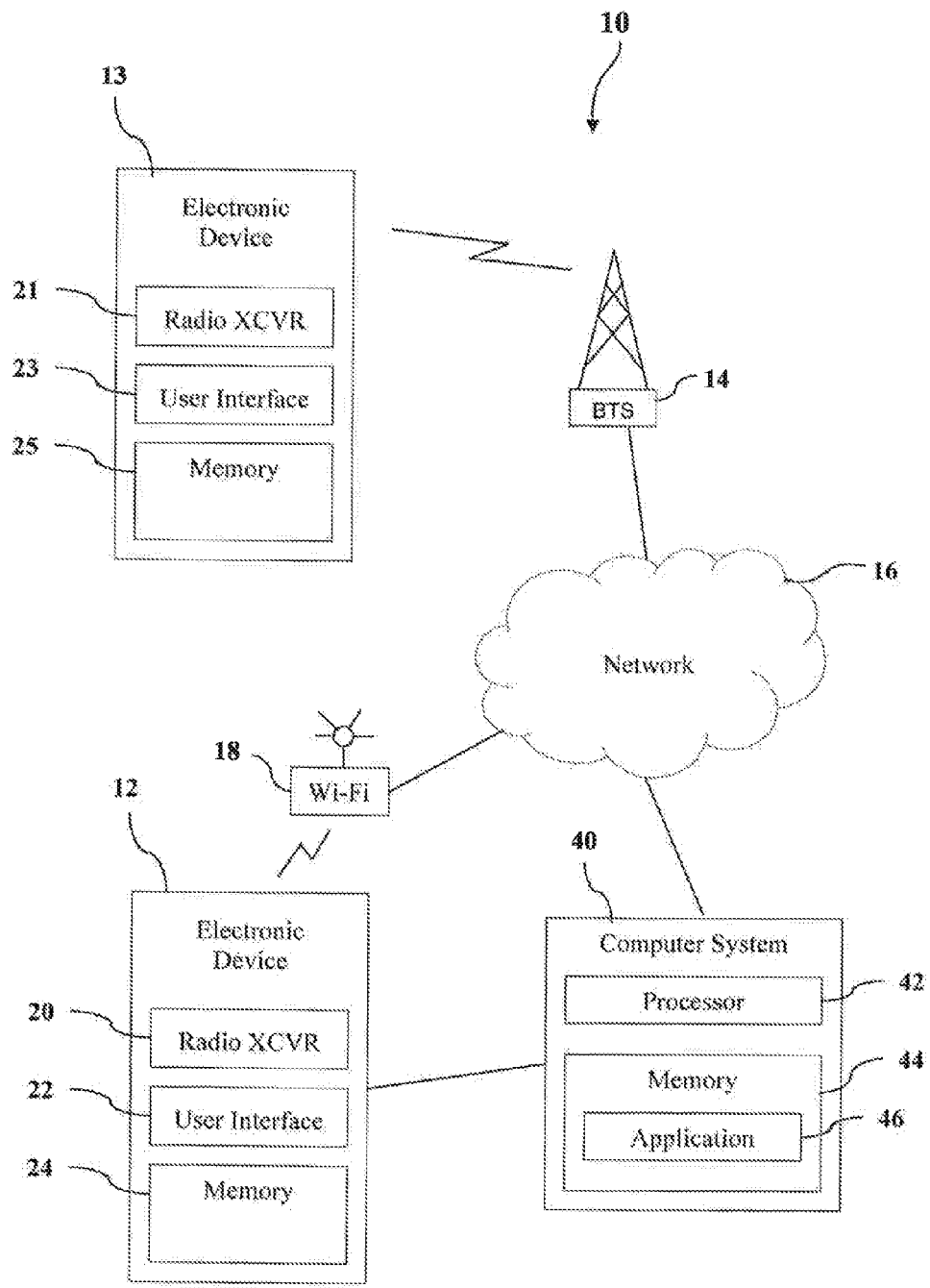
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system and method for post-sale diagnostics and repair of an electronic device is described. The electronic device may be a mobile phone, personal digital assistant, media player, laptop computer, tablet computer, electronic book, and other electronic devices. A handset is described in detail herein after. A diagnostic application is executed by a computer system. The computer system may be located in a commercial retail location, or may be on a server executing on a network accessed remotely via a communication link between the electronic device and the server. The communication link may be established over a wired connection, such as a Universal Serial Bus (USB) cable, or may be established over a wireless data connection such as Wi-Fi, Bluetooth®, or other mobile communications wireless protocols. The diagnostic application may establish a communication link with an electronic device for the purpose of troubleshooting an issue with the electronic device. The diagnostic application may identify the model of the electronic device and, based on the model identity, run a plurality of diagnostic tests on the electronic device. Based on the results of the diagnostic tests, the diagnostic application may invoke a command on the electronic device to perform a corrective action, such as performing a software update on the electronic device, or may alternatively present a corrective procedure to be performed on the device by a user. The corrective procedure may be displayed on the electronic device itself, on a display connected to the computer system executing the diagnostic application, or may be printed out as a written procedure to follow.

The post-sale diagnostic system described may provide benefits to both the electronic device user and a retail provider of the system. The electronic device user may benefit from a consistent, automated method to identify and resolve problems with the electronic device. Rather than waiting for a technician to troubleshoot the electronic device, the user can establish a communication link with the computer system and begin the diagnostic application upon entering the retail location. The retail provider for the electronic device may be able to provide a more efficient, cost-effective repair service to their customers and improved customer experience. The ability of the diagnostic system to triage, as well as resolve, electronic device problems may allow the provider to reduce the number of incidences of electronic device replacement without cause. The post-sale diagnostic system may allow the retail provider to educate the customer through printed reports providing test results, updates completed, recommended settings to improve battery life and menu shortcuts the customer may modify. In cases where the diagnostic tests identify a failure, the results may help the retail provider to explain the problem to the customer and the steps needed to resolve the issue.

In addition to performing diagnostics on an electronic device, the computer system executing the diagnostic application may store a result of the testing, including identifying information about the electronic device. This result data may then be analyzed, and based on the analysis, additional procedures may be added to the electronic device certification specification. These additional procedures may be sent back to the manufacturer of the electronic device, enabling the manufacturer to test, catch, and resolve common issues on new models and similar devices prior to sale. The stored test results and analysis may also be used to identify additional tests to be performed on the electronic device model, allowing the retail provider to propagate tests and procedures to other diagnostic system locations, providing a consistent handling of customers at all retail locations.

Turning now to FIG. 1, a system 10 is described. In an embodiment, the system 10 comprises a plurality of electronic devices 12, 13, a base transceiver station (BTS) 14, a network 16, a Wi-Fi access point 18, and a computer system 40. The computer system 40 comprises a processor 42 and a memory 44. The memory 44 may store an application 46. A computer system is described in more detail herein after. When executed by the processor 42, the application 46 may establish a first communication link with the first electronic device 12, where the first electronic device 12 has previously been sold. The application 46 may determine a first model identity of the first electronic device 12 and via the first communication link, and based on the first model identity, select a first plurality of diagnostic tests from a library of diagnostic tests. In an embodiment, the application 46 may further establish a second communication link with a second electronic device 13, where the second electronic device 13 has previously been sold, and where the first plurality of diagnostic tests are performed at the same time that the application 46 is testing the second electronic device 13. In a commercial retail environment, testing multiple devices concurrently may allow the retail provider to speed customer service and improve satisfaction.

In an embodiment, each of the electronic devices 12, 13 is one of a mobile phone, a personal digital assistant, and a media player. In an embodiment, the application 46 further determines a second model identity of the second electronic device 13 via the second communication link, where the second model identity is different from the first model identity. Based on the second model identity, the application 46 selects a second plurality of diagnostic tests from the library of diagnostic tests, where the second plurality of diagnostic tests and first plurality of diagnostic tests are not identical. The application 46 may then perform the second plurality of diagnostic tests, where at least some of the second plurality of diagnostic tests comprises invoking commands on the second electronic device 13 via the second communication link. The menus, features, and methods for enabling and using features may vary for different models of electronic device, and the diagnostic tests applied to the electronic devices may be adapted or automatically selected to accommodate these differences between devices.

In an embodiment, the application 46 selects the first plurality of diagnostic tests based on a problem history associated with the first model identity. The application 46 may allow the retail provider to identify known issues with a specific model of an electronic device and to identify diagnostic tests that check for the known issues to be run first. In an embodiment, the application 46 further selects the first plurality of diagnostic tests based on a probability of the diagnostic tests uncovering a problem in a device of the first model identity. For example, if half of the issues historically associated with a specific model are related to out of date device software, the application 46 includes tests to check the software version.

In an embodiment, the application 46 may select a plurality of diagnostic tests to test the device 12, 13 for the five most common failures associated with the specific device. Alternatively, the application 46 may select a plurality of diagnostic tests to test the device 12, 13 for those failures that the user can remedy on their own, possibly with prompting from an interface of the computer system 40. Diagnostic tests that are observed to identify problems experienced only rarely by users of the devices 12, 13 may be dropped from the test regime. In an embodiment, the diagnostic tests may test for successful call initiation, test for sending and receiving text messages, test picture mail, test successful web access, test successful data connection, test a firmware version of the devices 12, 13, test a preferred roaming list installation on the devices 12, 13.

Some of the diagnostics tests may be initiated and/or completed while the user of the device 12, 13 is en route to a retail location. For example, the user may call a customer care center about a problem they are experiencing on their device 12, 13. The customer care agent may direct the user to visit a nearby retail location for troubleshooting and assistance. The customer care agent may also ask permission to run some tests via remote wireless interactions with the subject device 12, 13 while the user is en route to the retail location. If the user agrees, the application 46 may establish a wireless communication link with the device 12, 13, for example via the base transceiver station 14, and execute some of the diagnostic tests while the user drives to the retail location. For example, the application 46 may initiate a test of call initiation, a test of text message sending and receiving, a test of web access, a test of data connection, a test of firmware version, a test of preferred roaming list while the user is driving to the retail location. The application 46 may check the subscriber account associated with the device 12, 13.

Further, in some cases a problem experienced by the device 12, 13 may be fixed over the wireless link while the user is en route to the retail store. For example, a firmware upgrade may be performed, a preferred roaming list may be updated, factory settings may be restored, or other corrective actions may be taken via the wireless communication link via the base transceiver station 14. Based on the results of these tests, the user may be greeted as the walk in the door of the retail store, "Mr Smith! Welcome! We have diagnosed and repaired your mobile phone via wireless communication while you were in transit. I think you will find that the problem is resolved now. I have printed a report of what our automated test system discovered was the source of your problem along with recommendations about how to avoid this issue in the future. Have a nice day!"

Some problems may be diagnosed while the user is en route to the retail location, but the corrective action may be performed in the retail location. For example, in an embodiment, a need to upgrade firmware may be identified while the user is in transit, but the actual firmware upgrade may be deferred until the user is in the retail location so they can be counseled on the possible results of the firmware upgrade—possible loss of customization settings or bookmarks—and so that the firmware upgrade can be performed in a more controlled environment.

Further, the application 46 may take the opportunity of the interaction with the user of the device 12, 13 coming to the retail location to educate the customer, for example by providing a print out with recommended setting values, how to navigate menus to input the settings, hints on how to improve battery life (conserve battery usage), and other.

Figure 2:
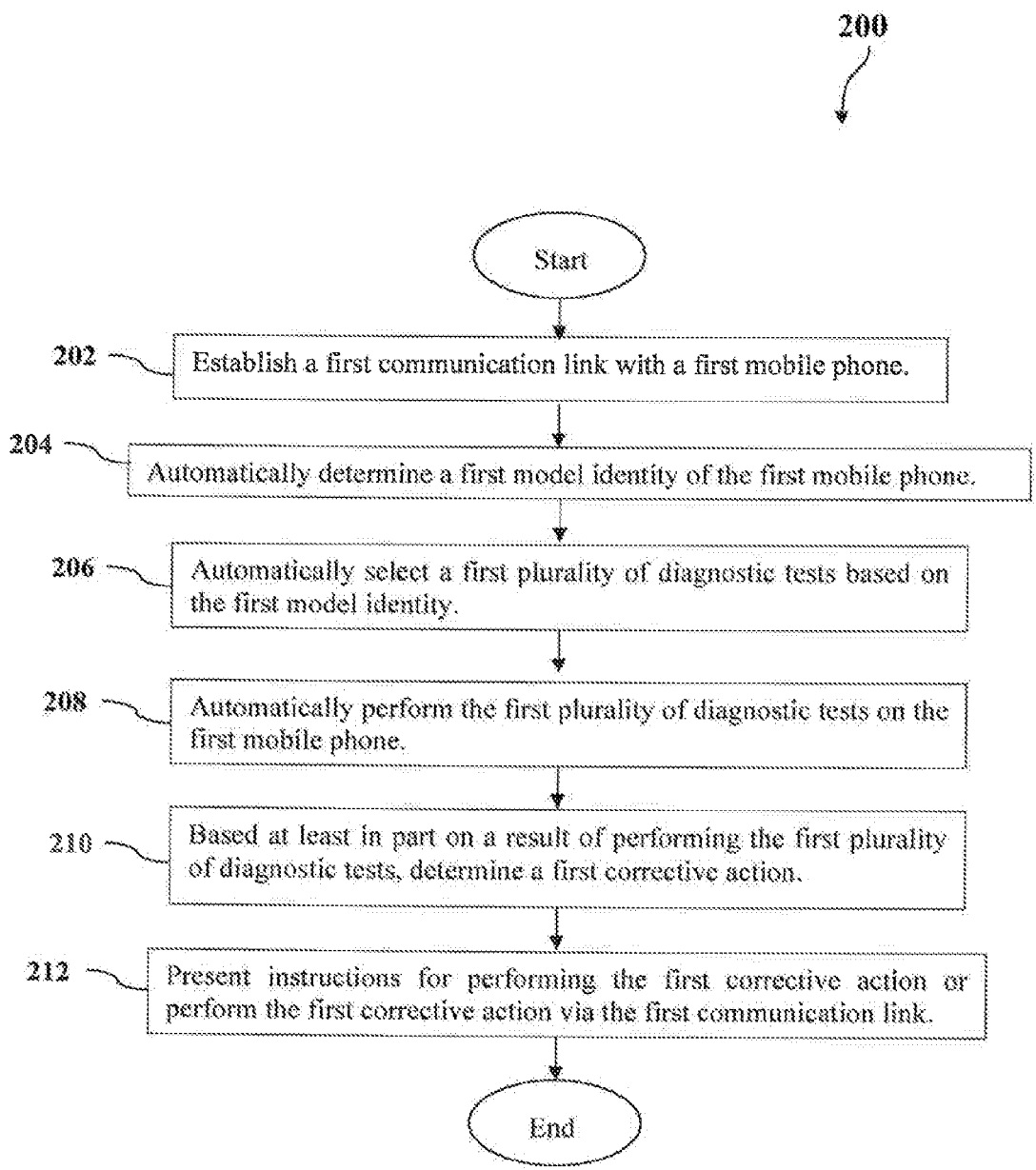
FIG. 2 is a flow chart of a method according to an embodiment of the disclosure.

Turning now to FIG. 2, a method 200 is described. At block 202, a first communication link is established between a computer system 40 and a first electronic device 12. At block 204, a first model identity for the first electronic device is automatically determined. At block 206, based on the first model identity, a first plurality of diagnostic tests is automatically selected. At block 208, the first plurality of diagnostic tests is automatically performed on the first electronic device 12. These tests may include checking software and application versions, verifying menu settings, and testing hardware and application functionality. At block 210, based at least in part on a result of performing the first plurality of diagnostic tests, a first corrective action is determined. At block 212, instructions for performing the first corrective action may be presented, or the first corrective action may be performed on the first electronic device 12 via the first communication link. The application 46 may be able to resolve the problem directly by initiating actions on the first electronic device 12 via the first communication link, such as triggering a software update. For example, in an embodiment, the application 46 may be able to stimulate the first electronic device 12 with inputs through a maintenance interface that has substantially the same effect as user keyboard or keypad inputs. In some contexts, this may be referred to as a hands-free testing mode of operation. In an embodiment, the testing may proceed much more quickly with electronic inputs emulating user inputs than could be the case with users actually keying the inputs into the first electronic device 12. The application 46 may also provide a print out with test results, software version information, and a summary of updates completed, including instructions for manual steps to perform if the problem was not already resolved.

In an embodiment, the instructions for performing the first corrective action comprise printed instructions comprising pictures of an electronic device 12 of the first model identity. Providing instructions with pictures of their specific device may assist the customers in resolving any issue and provide for a better customer experience. In an embodiment, automatically performing one of the first plurality of diagnostic tests comprises automatically reading a first battery power level value via an application programming interface (API) of the first electronic device 12 at a first time and automatically reading a second battery power level value via an application programming interface of the first electronic device 12 at a second time. Based on the first battery power level and the second battery power level, automatically determine a battery health condition and present the battery health condition one of in a display and in a print out. Testing in this manner may be used to determine how quickly the battery is being drained. This information could be combined with tests that review the electronic device 12 settings and the print out may include recommended settings to improve battery life.

In an embodiment, the first communication link between the computer system 40 and the electronic device 12 is established at least in part using a wireless communication link. For example, a Wi-Fi access point 18 may provide connectivity of the first electronic device 12 to the network 16 and through to the computer system 40 and to the application 46. Alternatively, the first electronic device 12 may communicate with the network 16 via a Bluetooth® wireless link. Alternatively, the wireless communication link to the electronic device, as illustrated with reference to the second electronic device 13 in FIG. 1, may be provided by a base transceiver station (BTS) 14 according to one or more of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless protocol. In some cases, the first electronic device 12 may communicate with the application 46 initially via a long range wireless protocol, for example via the base transceiver station 14 using one of a CDMA, GSM, LTE, or WiMAX wireless communication protocol, perhaps while a user of the first electronic device 12 is away from a retail store location and/or while in route to the retail store location, and later communicate with the application 46 via the Wi-Fi access point 18 or a wired link when arrived in the retail store.

In an embodiment, the first communication link with the first electronic device 12 may be established through one of a wired connection to the first electronic device 12 and a contact-to-contact connection to the first electronic device 12. The communication link may also be over a wired connection such as a universal serial bus (USB) cable, or through a contact-based connection such as a docking station.

In an embodiment, the first communication link may be established with the first electronic device 12 by a computer system 40 in the form of a self-service kiosk, where one of the instructions for performing the first corrective action is presented on a display of the self-service kiosk, or the self-service kiosk performs the first corrective action via the communication link on the first electronic device 12. A self-service kiosk may be located in a retail location but would allow the customer to perform the testing without the need to wait for a retail sales clerk or repair technician, providing a more efficient and consistent process for the customer.

In an embodiment, the method 200 may further comprise automatically determining that a first test driver is not installed on the first mobile phone and automatically writing the first test driver to the first electronic device 12, where at least one of the first plurality of diagnostic tests is automatically performed based on the first test driver. A driver is a software program allowing higher-level programs to interact with a hardware device. To adequately perform the required diagnostic tests, interaction with the electronic device 12 hardware may employ a test driver. The application 46 determines if the test driver is installed, and writes the test driver to the first electronic device 12 via the communication link when it is not already present.

In an embodiment, determining the first model identity of the first electronic device 12 may comprise automatically reading an electronic serial number (ESN) of the first electronic device 12 and retrieving the first model identity from a data store based on the electronic serial number. The electronic serial number uniquely identifies mobile devices, and is primarily used with code division multiple access mobile phones. The electronic serial number provides the application 46 with a means to identify the model identity for devices that may not automatically provide model information or auto detection via the communication link.

In an embodiment, the method 200 further comprises establishing a second communication link with the first electronic device 12 before establishing the first communication link, where some of the first plurality of diagnostic tests are automatically performed by invoking commands on the first electronic device 12 via the second communication link and some of the first plurality of diagnostic tests are automatically performed by invoking commands on the first electronic device 12 via the first communication link. In an embodiment, the first communication link is provided in an electronic device retail store location and the second communication link may be outside of the mobile phone retail store location. As an example, a customer who calls customer support to report an issue with their electronic device 12 may be requested to take their electronic device 12 to a retail store for diagnostic testing. At the same time, the customer support agent may be able to push a plurality of tests to the electronic device 12 over a wireless communication link, and the tests may execute on the electronic device 12 while the customer drives to the retail store location. Over the wireless communication link, the customer support agent may automatically test call initiation, data connectivity, and application versions on the electronic device 12. Additionally, the results over this wireless communication link may be fed back to the retail store location to help identify tests to run from the communication link that will be established when the customer arrives at the retail store. Upon receiving results of the tests run on the wireless link, the retail location can identify the electronic device 12 needs firmware and PRL updates, begin these updates when the first communication link is established, and re-test the electronic device 12 upon completion of the updates.

Taking this example a step further, the wireless communication link may be used to identify when the customer reaches the retail store by reading location information from the electronic device 12, for example location information provided by a global positioning system (GPS) receiver or other self-locating mechanism embedded in the electronic device 12, and notifying the retail store sales clerk of the customer's arrival, allowing the retail store sales clerk to greet the customer and immediately help to resolve their electronic device 12 problem. Alternatively, other location mechanisms may be used to locate the electronic device 12 such as trilateration techniques and/or coarse grained location of the electronic device 12 based on a serving cell sector. If a failure is identified that cannot be fixed, the retail sales clerk may even have a replacement electronic device 12 waiting when the customer arrives.

Figure 3:
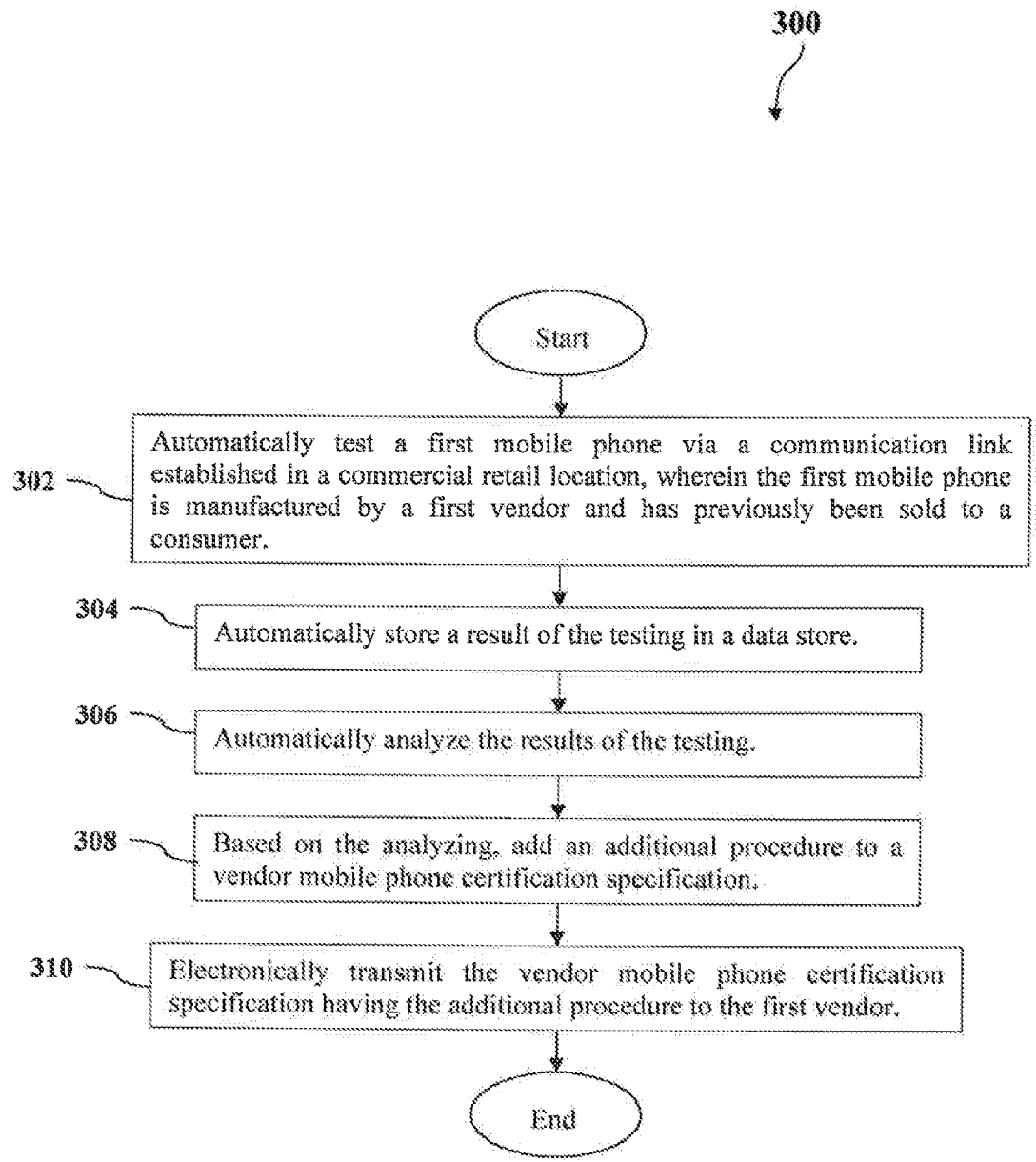
FIG. 3 is a flow chart of a method according to an embodiment of the disclosure.

Turning now to FIG. 3, a method 300 is described. At block 302, a first electronic device 12 is automatically tested via a communication link to a computer system 40 established in a commercial retail location. At block 304, a result of the testing is automatically stored in a data store. At block 306, the results of the testing are automatically analyzed. At block 308, based on the analysis of the test results, an additional procedure is added to a vendor electronic device certification specification. The vendor electronic device certification specification can be enhanced by applying the knowledge gained in real world use as opposed to testing only against requirements and design specifications. In an embodiment, an engineering unit or original equipment manufacturing liaison business unit of a wireless communication service provider may update the vendor electronic device certification specification based on the analysis of the test results or of an aggregation of results over many handsets.

At block 310, the vendor electronic device certification specification having the additional procedure is electronically transmitted to the first vendor. For example, in addition to improving the customer repair experience and their internal processes, a retail service provider may utilize the diagnostic test data to update and improve the certification testing for an electronic device 12 and to provide the updated procedure to the manufacturer of the electronic device 12. If an issue with a particular electronic device 12 model is revealed through the diagnostic testing, the retail service provider can update the certification procedure and electronically deliver the updates to the manufacturer. The manufacturer would then utilize the updated certification procedure in testing new electronic devices 12. This feedback loop between the retail service provider and the electronic device 12 manufacturer allows for a continual refinement of new electronic devices 12 through continued refinement of the testing and certification process.

In an embodiment, the method 300 further comprises automatically reading a performance history from the first electronic device 12 and automatically transmitting the performance history to a network maintenance data store. A retail service provider which also provides a communications network used by the electronic device 12 may correlate the performance data from the electronic device 12 with the data from their communications network and identify if a network issue led to the device issue being reported. The performance data might also be used to identify locations in need of new towers to improve network coverage. In an embodiment, the method 300 additionally comprises automatically testing a second electronic device 13 based on the performance history from the first electronic device 12. The retail service provider may utilize the data from the performance history of a first electronic device 12 to prioritize and suggest diagnostic tests to run on a second electronic device 13. For example, if the performance history from a mobile phone shows dropped calls caused by a low signal strength, diagnostic tests targeting the radio transceiver 20 could be run on a second mobile phone to verify the radio transceiver 20 is operating within specifications.

In an embodiment, the method 300 further comprises determining the status of a communication network based at least in part on the performance history of the first electronic device 12. For example, the communication network service provider may utilize the history data collected from the first electronic device 12 to identify weak spots in their network based on location information collected when a dropped call is recorded by the first electronic device 12. By collecting this type of information from a multitude of electronic devices 12 and/or different device types, the communication network service provider may identify and target network performance issues as well as electronic device issues to better serve their customers.

Figure 4:
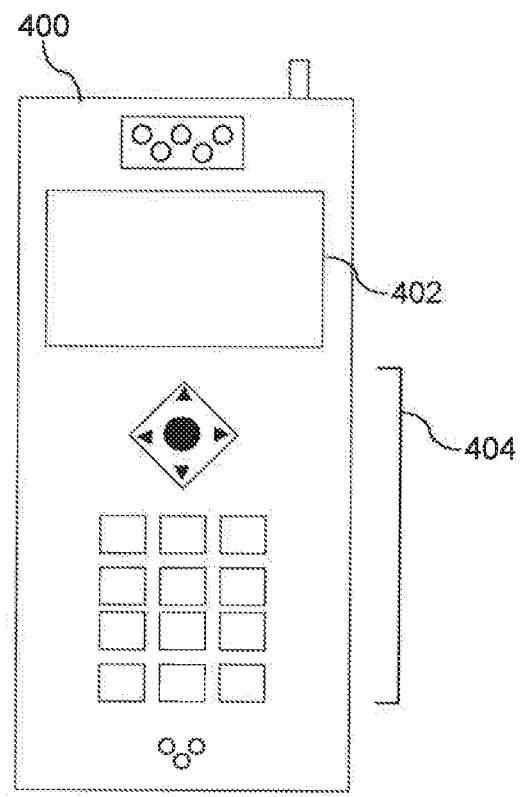
FIG. 4 is an illustration of a mobile device according to an embodiment of the disclosure.

FIG. 4 shows a wireless communications system including the mobile device 400. FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 400 is not a general purpose computing device like a portable, laptop or tablet computer, but rather is a special-purpose communications device such as a mobile phone, wireless handset, pager, or PDA. The mobile device 400 may support specialized activities such as gaming, inventory control, job control, and/or task management functions, and so on.

The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400.

Figure 5:
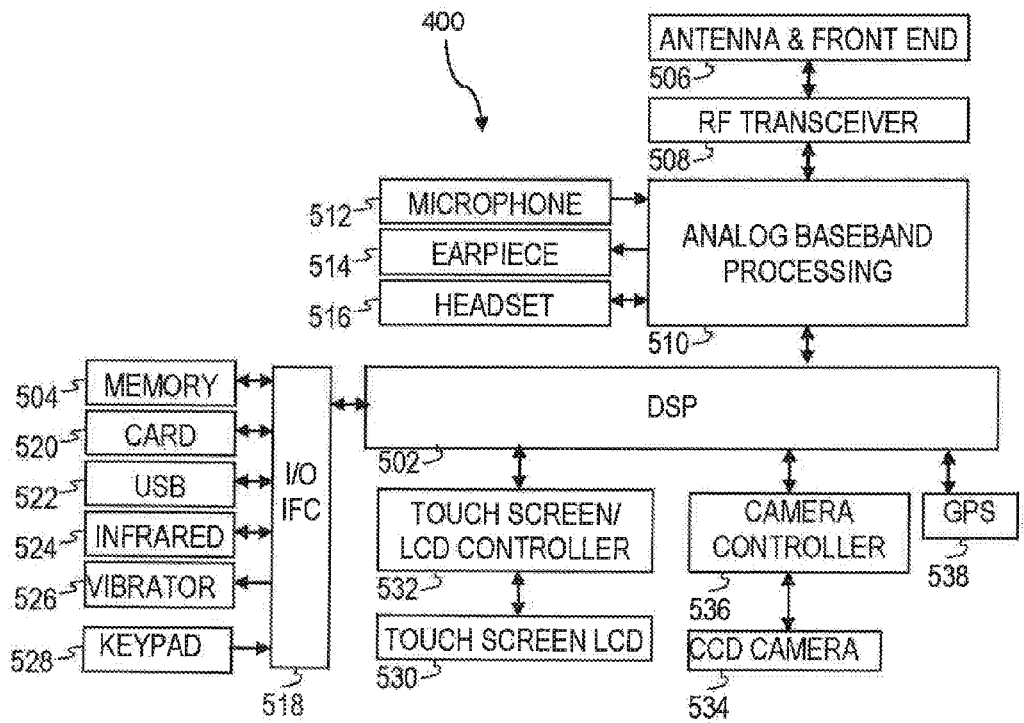
FIG. 5 is a block diagram of a mobile device according to an embodiment of the disclosure.

FIG. 5 shows a block diagram of the mobile device 400. While a variety of known components of handsets 400 are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 400 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 400 to send and receive information from a radio access network (RAN) or some other available wireless communications network or from a peer mobile device 400. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 400 to be used as a mobile phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The input/output interface 518 may further connect the DSP 502 to the vibrator 526 that, when triggered, causes the mobile device 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530.

The CCD camera 534 enables the mobile device 400 to take digital pictures. The DSP 502 communicates with the CCD camera 534 via the camera controller 536. The GPS sensor 538 is coupled to the DSP 502 to decode global positioning system signals, thereby enabling the mobile device 400 to determine its position. In another embodiment, a camera operating according to a technology other than charge coupled device cameras may be employed. Various other peripherals may also be included to provide additional functions, e.g., radio and television reception.

Figure 6:
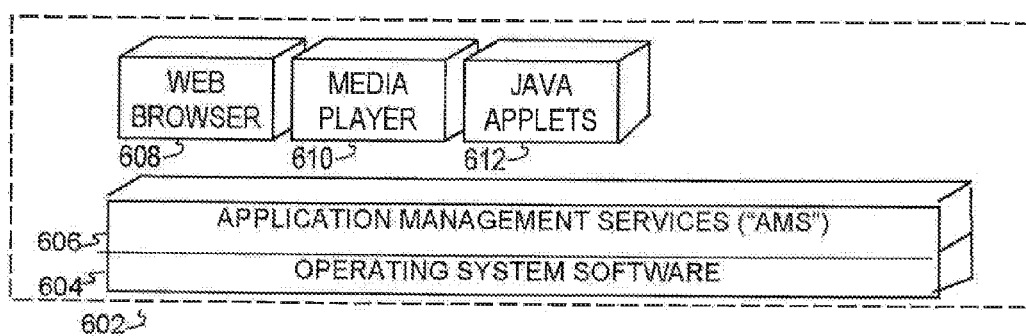
FIG. 6 is a block diagram of a software architecture for a mobile device according to an embodiment of the disclosure.

FIG. 6 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 400. Also shown in FIG. 6 are a web browser application 608, a media player application 610, and JAVA applets 612. The web browser application 608 configures the mobile device 400 to operate as a web browser, allowing a user to enter information into forms and select links to retrieve and view web pages. The media player application 610 configures the mobile device 400 to retrieve and play audio or audiovisual media. The JAVA applets 612 configure the mobile device 400 to provide games, utilities, and other functionality.

Figure 7:
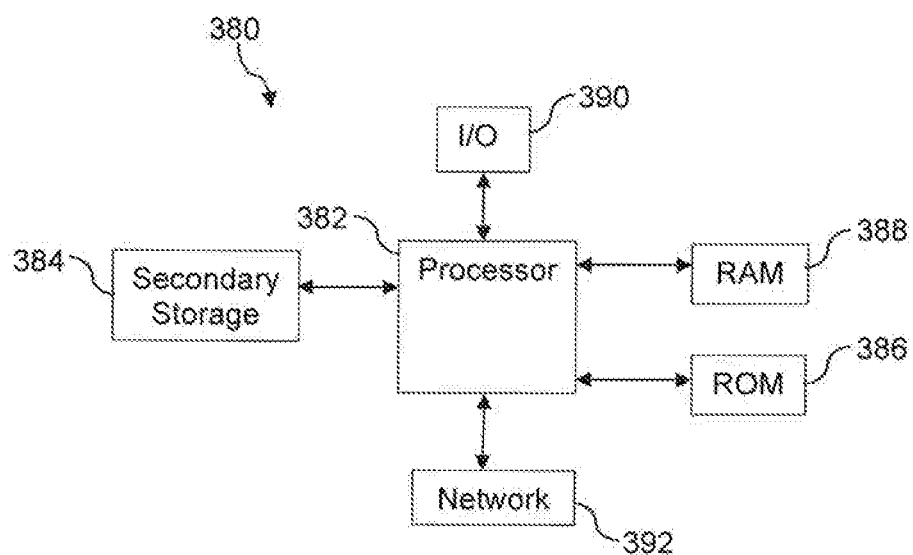
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for post-sale electronic device diagnostics, comprising:
    a computer system;
    a memory coupled to the computer system; and
    an application stored in the memory that, when executed by the computer system, establishes a first communication link with a first electronic device,
        wherein the first electronic device has previously been sold, determines a first model identity of the first electronic device via the first communication link, based on the first model identity, selects a first plurality of diagnostic tests from a library of diagnostic tests, performs the first plurality of diagnostic tests, wherein at least some of the first plurality of diagnostic tests comprises invoking commands on the first electronic device via the first communication link,
        based on a result of the first plurality of diagnostic tests, one of presents a description of a corrective procedure to perform on the first electronic device or invokes a command on the first electronic device via the communication link to perform a corrective procedure on the first electronic device,
        establishes a second communication link with a second electronic device, wherein the second electronic device has previously been sold,
        determines a second model identity of the second electronic device via the second communication link, wherein the second model identity is different from the first model identity,
        based on the second model identity, selects a second plurality of diagnostic tests from the library of diagnostic tests, wherein the second plurality of diagnostic tests and the first plurality of diagnostic tests are not identical, and
        performs the second plurality of diagnostic tests, wherein at least some of the second plurality of diagnostic tests comprises invoking commands on the second electronic device via the second communication link, and wherein the first plurality of diagnostic tests are performed at the same time that the application is testing the second electronic device.

2. The system of claim 1, wherein the first electronic device is one of a mobile phone, a personal digital assistant, and a media player.

3. The system of claim 1, wherein the application selects the first plurality of diagnostic tests based on a problem history associated with the first model identity.

4. The system of claim 1, wherein the application selects the first plurality of diagnostic tests based on a probability of the diagnostic tests uncovering a problem in a device of the first model identity.

* * * * *